J. E. DWYER.
RETURN AIRSHIP.
APPLICATION FILED OCT. 20, 1915. RENEWED NOV. 13, 1917.
1,278,123.  
Patented Sept. 10, 1918.
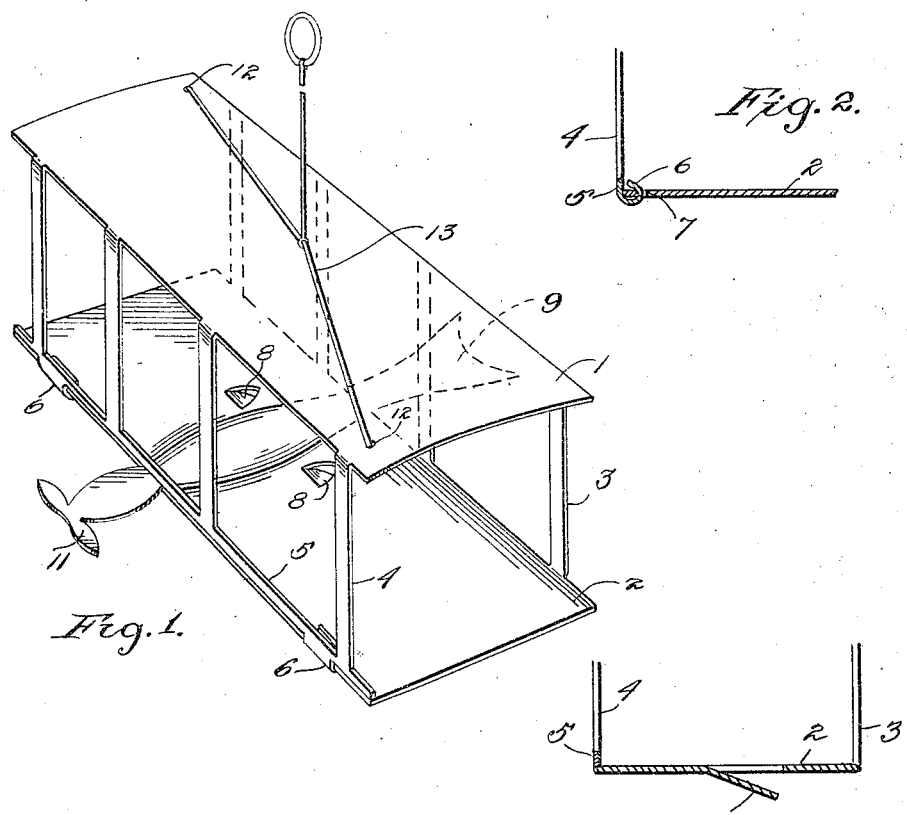
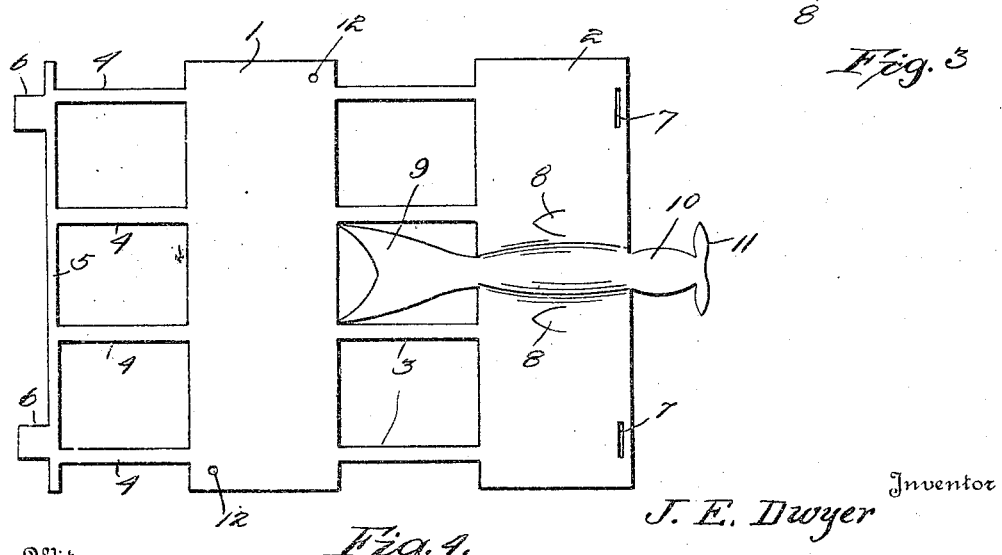
J. E. Dwyer, Inventor

UNITED STATES PATENT OFFICE.

JOHN E. DWYER, OF SPRINGFIELD, OHIO.

RETURN-AIRSHIP.

1,278,123.

Specification of Letters Patent.   Patented Sept. 10, 1918.

Application filed October 20, 1915, Serial No. 56,898. Renewed November 13, 1917. Serial No. 201,876.

*To all whom it may concern:*

Be it known that I, JOHN E. DWYER, a citizen of the United States, residing at Springfield, in the county of Clark, State of Ohio, have invented certain new and useful Improvements in Return-Airships; and I do hereby declare the following to be a full, clear, and exact description of the invention, such as will enable other skilled in the art to which it appertains to make and use the same.

This invention relates to a return airship.

An object of the invention resides in the provision of a device of the character specified which may be easily and cheaply manufactured and which is made from one piece of material.

With this and other objects in view, such as will appear as my description progresses, my invention comprises the combination and arrangement of parts as set forth in and falling within the scope of the appended claims.

In the drawing:

Figure 1 is a perspective view of a device constructed in accordance with my invention;

Fig. 2 is a fragmental detail showing the manner of securing the two edges of the device together;

Fig. 3 is a fragmental sectional view taken transversely of the machine, and

Fig. 4 is a view of the blank.

Referring to the drawing by reference characters wherein like parts are indicated by like characters throughout the several views:

In the embodiment of the invention shown in the drawing, I have illustrated a device which consists of upper and lower planes 1 and 2. Extending between and formed integral with the rear edges of the planes are a plurality of struts 3. Extending downwardly from the forward edge of the upper plane 1 are a plurality of struts 4, which struts are joined together at their lower ends by a strip 5, on which strips fastening ears 6 are formed, which ears are bent back upon themselves and through openings 7 in the lower plane 2 so as to secure the front struts in place. A portion of the material which forms the lower plane 2 is struck out to form portions 8 which represent wheels. Formed integral with and extending outwardly from the rear edges of the lower plane 2 is a tail 9 which represents that of a bird and extending outwardly from the forward edge of this plane 2 is a portion 10 which represents the head of a bird and on which portion fans 11 are formed. The portion of the lower plane 2 which lies between the tail 9 and the head 10 is embossed to represent the body of the bird. A pair of holes 12 are formed in the opposite diagonal corners of the upper plane 1 and a resilient member 13 is mounted in these holes, on the end of which resilient member a ring is secured. The resilient member is provided so that the device may be readily suspended from a suitable support, the ring facilitating the attachment of the member 13 to the said support.

By an inspection of Fig. 4 of the drawing, in which the parts just described have been indicated by the same reference characters; it will be noted that the entire device is stamped from one piece of material.

While I have illustrated and described a particular embodiment of my invention, it has merely been for the sake of convenience and I do not wish to be limited to that particular embodiment as it is obivous that numerous changes may be made in the details of construction without departing from the spirit of the invention or exceeding the scope of the appended claims.

What I claim is:

1. In a device of the class described, the combination with a pair of spaced planes, of struts formed integral with the rear edges of each of said planes and extending between the same, struts formed integral with the forward edge of one of the planes, a strip securing the ends of the last mentioned struts together and means for securing the said strip to the forward edge of the adjacent plane.

2. In a device of the class described, a pair of planes, struts supporting the same in spaced relation, and a tail, head and fan members extending from one of said planes, all of said members being formed from a single piece of material.

In testimony whereof, I affix my signature, in the presence of two witnesses.

JOHN E. DWYER.

Witnesses:
 EDWIN S. HOUCK,
 GEORGE A. BEARD.